US011160021B2

(12) United States Patent
Raghavan et al.

(10) Patent No.: US 11,160,021 B2
(45) Date of Patent: Oct. 26, 2021

(54) GROUP WAKE UP SIGNALING FOR MILLIMETER WAVE RELAY NODE DISCOVERY

(71) Applicant: QUALCOMM Incorporated, San Diego, CA (US)

(72) Inventors: Vasanthan Raghavan, West Windsor Township, NJ (US); Tianyang Bai, Bridgewater, NJ (US); Jung Ho Ryu, Fort Lee, NJ (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/892,669

(22) Filed: Jun. 4, 2020

(65) Prior Publication Data

US 2021/0014787 A1 Jan. 14, 2021

Related U.S. Application Data

(60) Provisional application No. 62/873,495, filed on Jul. 12, 2019.

(51) Int. Cl.
H04W 52/02 (2009.01)
H04W 48/16 (2009.01)
H04W 64/00 (2009.01)

(52) U.S. Cl.
CPC ....... *H04W 52/0219* (2013.01); *H04W 48/16* (2013.01); *H04W 64/006* (2013.01)

(58) Field of Classification Search
CPC ............. H04W 52/0219; H04W 48/16; H04W 64/006

(Continued)

(56) References Cited

U.S. PATENT DOCUMENTS 8,743,723 B2 * 6/2014 Watfa ................ H04W 72/1289
370/252
8,755,316 B2 * 6/2014 Aschan ............. H04W 52/0216
370/311

(Continued)

FOREIGN PATENT DOCUMENTS

EP 3043577 A1 7/2016
EP 3661099 A1 6/2020

(Continued)

OTHER PUBLICATIONS

CATT: "DL and UL Reference Signals for NR Positioning", 3GPP Draft; R1-1905346, DL and UL Reference Signals For NR Positioning, 3rd Generation Partnertship Project (3GPP), Mobile Competence Centre; 605, Route Des Lucioles: F-06921 Sophia-Antipolis Cedex, France, vol. RAN WG1, No. Xi'an, China; Apr. 8, 2019-Apr. 12, 2019, Apr. 3, 2019 (Apr. 3, 2019), XP051707421, Retrieved from Internet:URL:http://www.3gpp.org/ftp/tsg%5Fran/WG1%5FRL1/TSGR1%/Docs/R1%2D1905346%2Ezip [retrieved on Apr. 3, 2019], Par. 3.

(Continued)

Primary Examiner — Hai V Nguyen
(74) Attorney, Agent, or Firm — Patterson & Sheridan, LLP

(57) ABSTRACT

Certain aspects of the present disclosure provide techniques for group wake up signaling for millimeter wave relay node discovery. A method that may be performed by a base station (BS) includes communicating with a plurality of user equipments (UEs) in a cell, configuring a plurality of wake-up signals (WUSs) to transmit to different groups of UEs of the plurality of UEs in the cell, wherein configuring the plurality of WUSs is based, at least in part, on a relative location of each of the UEs in the different groups of UEs, and transmitting the plurality of WUSs to the different groups of UEs.

28 Claims, 11 Drawing Sheets

(58) Field of Classification Search
USPC .......................................... 455/574; 327/544
See application file for complete search history.

(56) References Cited

U.S. PATENT DOCUMENTS

| | | | | |
|---|---|---|---|---|
| 8,837,340 | B2* | 9/2014 | Kwon | H04W 76/28 |
| | | | | 370/311 |
| 8,964,672 | B2* | 2/2015 | Suzuki | H04W 68/025 |
| | | | | 370/329 |
| 9,497,785 | B2* | 11/2016 | Schmidt | H04W 76/10 |
| 10,219,312 | B2* | 2/2019 | Yang | H04W 52/0216 |
| 10,652,826 | B2* | 5/2020 | Lin | H04W 52/0219 |
| 10,728,950 | B2* | 7/2020 | Nagaraja | H04W 24/10 |
| 10,764,825 | B2* | 9/2020 | Tsuda | H04W 76/20 |
| 10,791,512 | B2* | 9/2020 | Kadiri | H04L 5/0098 |
| 10,863,494 | B2* | 12/2020 | Zhang | H04L 5/005 |
| 2011/0255454 | A1* | 10/2011 | Hauser | H04W 88/04 |
| | | | | 370/311 |
| 2012/0113843 | A1* | 5/2012 | Watfa | H04W 72/1289 |
| | | | | 370/252 |
| 2012/0155355 | A1* | 6/2012 | Kwon | H04W 76/28 |
| | | | | 370/311 |
| 2013/0114484 | A1* | 5/2013 | Suzuki | H04W 68/025 |
| | | | | 370/311 |
| 2015/0351135 | A1* | 12/2015 | Schmidt | H04W 76/10 |
| | | | | 455/450 |
| 2016/0135242 | A1* | 5/2016 | Hampel | H04W 76/14 |
| | | | | 370/329 |
| 2016/0150507 | A1* | 5/2016 | Kim | H04W 4/70 |
| | | | | 455/450 |
| 2016/0278147 | A1* | 9/2016 | Adrangi | H04W 12/06 |
| 2017/0188406 | A1* | 6/2017 | Baugh | H04W 40/16 |
| 2018/0063883 | A1* | 3/2018 | Nagaraja | H04W 72/046 |
| 2018/0132292 | A1* | 5/2018 | Yang | H04W 76/18 |
| 2018/0234919 | A1* | 8/2018 | Tsuda | H04W 52/0216 |
| 2019/0021052 | A1* | 1/2019 | Kadiri | H04W 24/10 |
| 2019/0159128 | A1* | 5/2019 | Lin | H04L 5/0048 |
| 2019/0174449 | A1* | 6/2019 | Shan | H04W 60/00 |
| 2019/0174466 | A1* | 6/2019 | Zhang | H04L 5/0048 |
| 2019/0297577 | A1* | 9/2019 | Lin | H04W 52/0229 |
| 2019/0342851 | A1* | 11/2019 | Shan | H04W 76/11 |
| 2020/0007223 | A1* | 1/2020 | Zhu | H04B 7/2606 |
| 2020/0053647 | A1* | 2/2020 | Chae | H04W 72/0446 |
| 2020/0163017 | A1* | 5/2020 | Priyanto | H04W 88/04 |
| 2020/0214082 | A1* | 7/2020 | Luo | H04L 5/00 |
| 2020/0245395 | A1* | 7/2020 | Zhang | H04L 5/0053 |
| 2020/0275372 | A1* | 8/2020 | Lin | H04W 52/0219 |
| 2021/0014729 | A1* | 1/2021 | Raghavan | H04W 28/06 |

FOREIGN PATENT DOCUMENTS

| | | |
|---|---|---|
| WO | 2019029466 A1 | 2/2019 |
| WO | 2019095323 A1 | 5/2019 |

OTHER PUBLICATIONS

International Search Report and Written Opinion—PCT/US2020/036291—ISA/EPO—dated Sep. 14, 2020.
Qualcomm Incorp.: "WUS grouping design overview and UE distribution", 3GPP Draft; R2-2906249 WUS Group Design,3rrd Generation Partnership Project (3GPP), Mobile Competence Centre; 650 Route Des Lucioles, F-06921 Sophia-Antipolis Cedex; France, vol. WG2 No. Reno, USA; May 13, 2019-May 17, 2019 May 13, 2019, XP051729719, Retrieved from Internet: URL: http://www.3gppp.org/ftp/Meeting%5F3GPP%5FSYNC/RAN2/Docs/R2%2D1906249%2Ezip, [Retrieved on May 3, 2019], paragraphs 1, 2, 4.

* cited by examiner

GROUP WAKE UP SIGNALING FOR MILLIMETER WAVE RELAY NODE DISCOVERY

CLAIM OF PRIORITY UNDER 35 U.S.C. § 119

This application claims benefit of U.S. Provisional Patent Application Ser. No. 62/873,495, filed Jul. 12, 2019, which is assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for group wake up signaling for millimeter wave relay node discovery.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved group wake up signaling for millimeter wave relay node discovery.

Certain aspects provide a method for wireless communication by a base station (BS). The method generally includes communicating with a plurality of user equipments (UEs) in a cell, configuring a plurality of wake-up signals (WUSs) to transmit to different groups of UEs of the plurality of UEs in the cell, wherein configuring the plurality of WUSs is based, at least in part, on a relative location of each of the UEs in the different groups of UEs, and transmitting at least one of the plurality of WUSs to at least one group of UEs of the different groups of UEs.

Certain aspects provide an apparatus for wireless communication by a base station (BS). The apparatus generally includes at least one processor configured to communicate with a plurality of user equipments (UEs) in a cell, configure a plurality of wake-up signals (WUSs) to transmit to different groups of UEs of the plurality of UEs in the cell, wherein configuring the plurality of WUSs is based, at least in part, on a relative location of each of the UEs in the different groups of UEs, and transmit at least one of the plurality of WUSs to at least one group of UEs of the different groups of UEs. The apparatus also generally includes a memory coupled with the at least one processor.

Certain aspects provide an apparatus for wireless communication by a base station (BS). The apparatus generally includes means for communicating with a plurality of user equipments (UEs) in a cell, means for configuring a plurality of wake-up signals (WUSs) to transmit to different groups of UEs of the plurality of UEs in the cell, wherein configuring the plurality of WUSs is based, at least in part, on a relative location of each of the UEs in the different groups of UEs, and means for transmitting at least one of the plurality of WUSs to at least one group of UEs of the different groups of UEs.

Certain aspects provide a non-transitory computer-readable medium for wireless communication by a base station (BS). The non-transitory computer-readable medium generally includes instructions that, when executed by at least one processor, cause the at least one processor to communicate with a plurality of user equipments (UEs) in a cell, configure a plurality of wake-up signals (WUSs) to transmit to different groups of UEs of the plurality of UEs in the cell, wherein configuring the plurality of WUSs is based, at least in part, on a relative location of each of the UEs in the different groups of UEs, and transmit at least one of the plurality of WUSs to at least one group of UEs of the different groups of UEs.

Certain aspects provide a method for wireless communication by a user equipment (UE). The method generally includes communicating with a base station in a cell that includes a plurality of UEs, entering into a sleep cycle of a connected mode discontinuous reception (CDRX) mode, receiving a wake up signal (WUS) from the BS, wherein the WUS is based, at least in part, on a relative location of the UE with respect to other UEs of the plurality of UEs in the cell, and waking up from the sleep cycle based, at least in part on the WUS.

Certain aspects provide an apparatus for wireless communication by a user equipment (UE). The apparatus generally includes at least one processor configured to communicate with a base station in a cell that includes a plurality of UEs, enter into a sleep cycle of a connected mode discontinuous reception (CDRX) mode, receive a wake up signal (WUS) from the BS, wherein the WUS is based, at least in part, on a relative location of the UE with respect to other UEs of the plurality of UEs in the cell, and wake up from the sleep cycle based, at least in part on the WUS. The apparatus also generally includes a memory coupled with the at least one processor.

Certain aspects provide an apparatus for wireless communication by a user equipment (UE). The apparatus generally includes means for communicating with a base station in a cell that includes a plurality of UEs, means for entering into a sleep cycle of a connected mode discontinuous reception (CDRX) mode, means for receiving a wake up signal (WUS) from the BS, wherein the WUS is based, at least in part, on a relative location of the UE with respect to other UEs of the plurality of UEs in the cell, and means for waking up from the sleep cycle based, at least in part on the WUS.

Certain aspects provide a non-transitory computer-readable medium for wireless communication by a user equipment (UE). The non-transitory computer-readable medium generally includes instructions that, when executed by at least one processor, cause the at least one processor to communicate with a base station in a cell that includes a plurality of UEs, enter into a sleep cycle of a connected mode discontinuous reception (CDRX) mode, receive a wake up signal (WUS) from the BS, wherein the WUS is based, at least in part, on a relative location of the UE with respect to other UEs of the plurality of UEs in the cell, and wake up from the sleep cycle based, at least in part on the WUS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
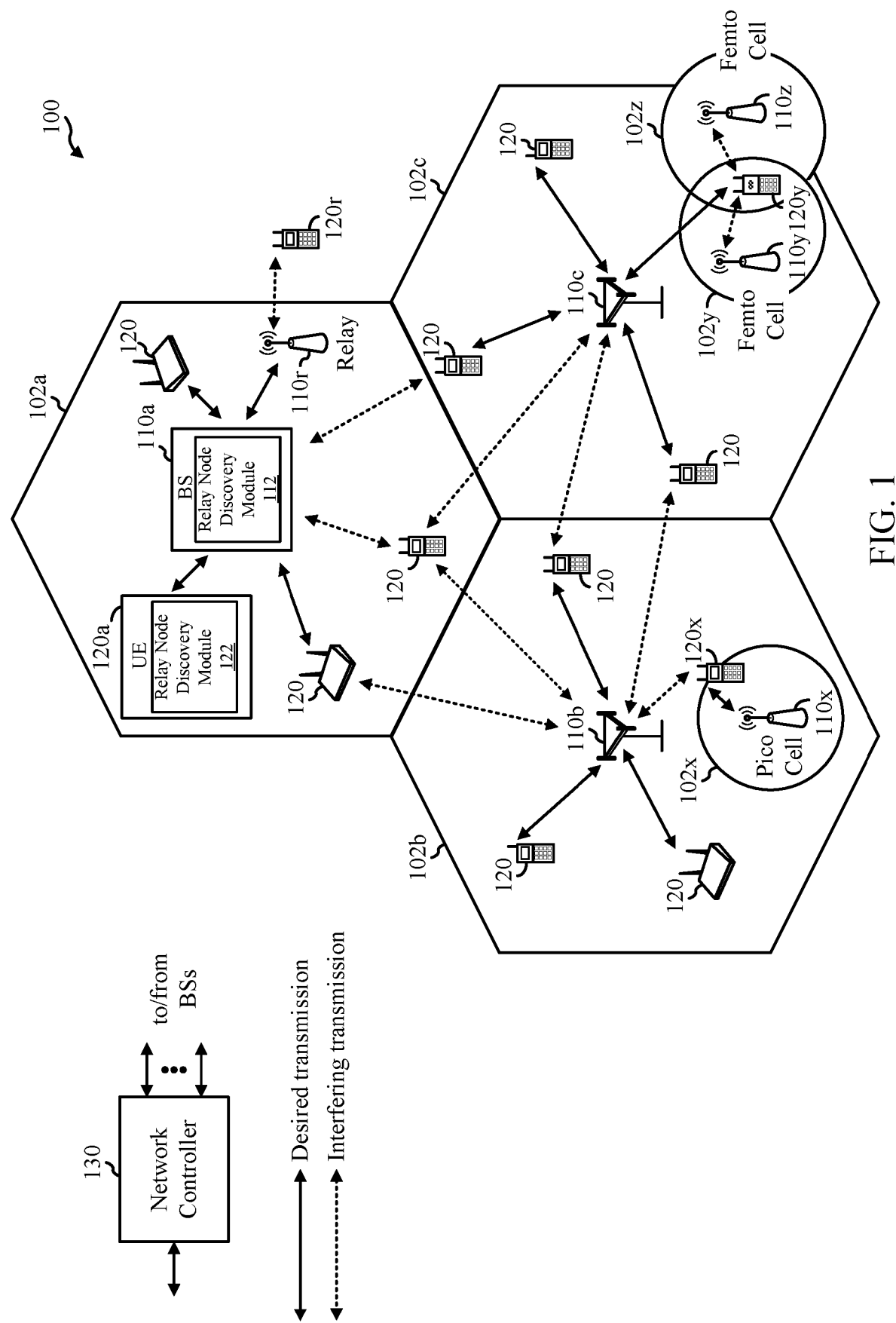
FIG. 1 is a block diagram conceptually illustrating an example telecommunications system, in accordance with certain aspects of the present disclosure.

Aspects of the present disclosure provide apparatus, methods, processing systems, and computer readable mediums for millimeter wave relay node discovery based on group wake up signaling. For example, in some cases, techniques presented herein may involve configuring a plurality of wake up signals (WUSs) for transmission to different groups of UEs in a cell based on a relative location of each of the UEs in the different groups of UEs. Transmitting WUSs to different groups of UEs based on the relative location of each UE in a group may provide for coordination of wake-up cycles for UEs in that group. Further, coordinating wake-up cycles for UEs in the group may allow for the UEs in that group to discover each other while also allowing other UEs in other groups to conserve power by remaining in a sleep mode The following description provides examples of techniques for millimeter wave relay node discovery based on group wake up signaling, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. For clarity, while aspects may be described herein using terminology commonly associated with 3G, 4G, and/or 5G new radio (NR) wireless technologies, aspects of the present disclosure can be applied in other generation-based communication systems, including later technologies.

NR may utilize orthogonal frequency division multiplexing (OFDM) on the downlink and/or uplink and single-carrier frequency division multiplexing (SC-FDM) on the uplink and/or downlink. NR may support half-duplex operation using time division duplexing (TDD). OFDM and SC-FDM partition the system bandwidth into multiple orthogonal subcarriers, are referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. For example, the based subcarrier spacing (SCS) may be 15 kHz and other SCS may be defined with respect to the base SCS (e.g., 30 kHz, 60 kHz, 120 kHz, 240 kHz, etc.). The minimum resource allocation (e.g., a resource block (RB)) may be 12 consecutive subcarriers (or 180 kHz). The system bandwidth may also be partitioned into subbands covering multiple RBs. In NR, a subframe is 1 ms, but the basic transmission time interval (TTI) is referred to as a slot. A subframe contains a variable number of slots (e.g., 1, 2, 4, 8, 16, . . . slots) depending on the SCS. The symbol, slot lengths, and CP scale with the SCS.

NR may support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for millimeter wave relay node discovery based on group wake up signaling. As shown in FIG. 1, the BS 110a includes a relay node discovery module 112. The relay node discovery module 112 may be configured to perform the operations illustrated in FIG. 5, as well as other operations disclosed herein for millimeter wave relay node discovery based on group wake up signaling, in accordance with aspects of the present disclosure. Additionally, as shown in FIG. 1, the UE 120a includes a relay node discovery module 122. The relay node discovery module 122 may be configured to perform the operations illustrated in FIG. 6, as well as other operations disclosed herein for millimeter wave relay node discovery based on group wake up signaling, in accordance with aspects of the present disclosure.

Figure 2:
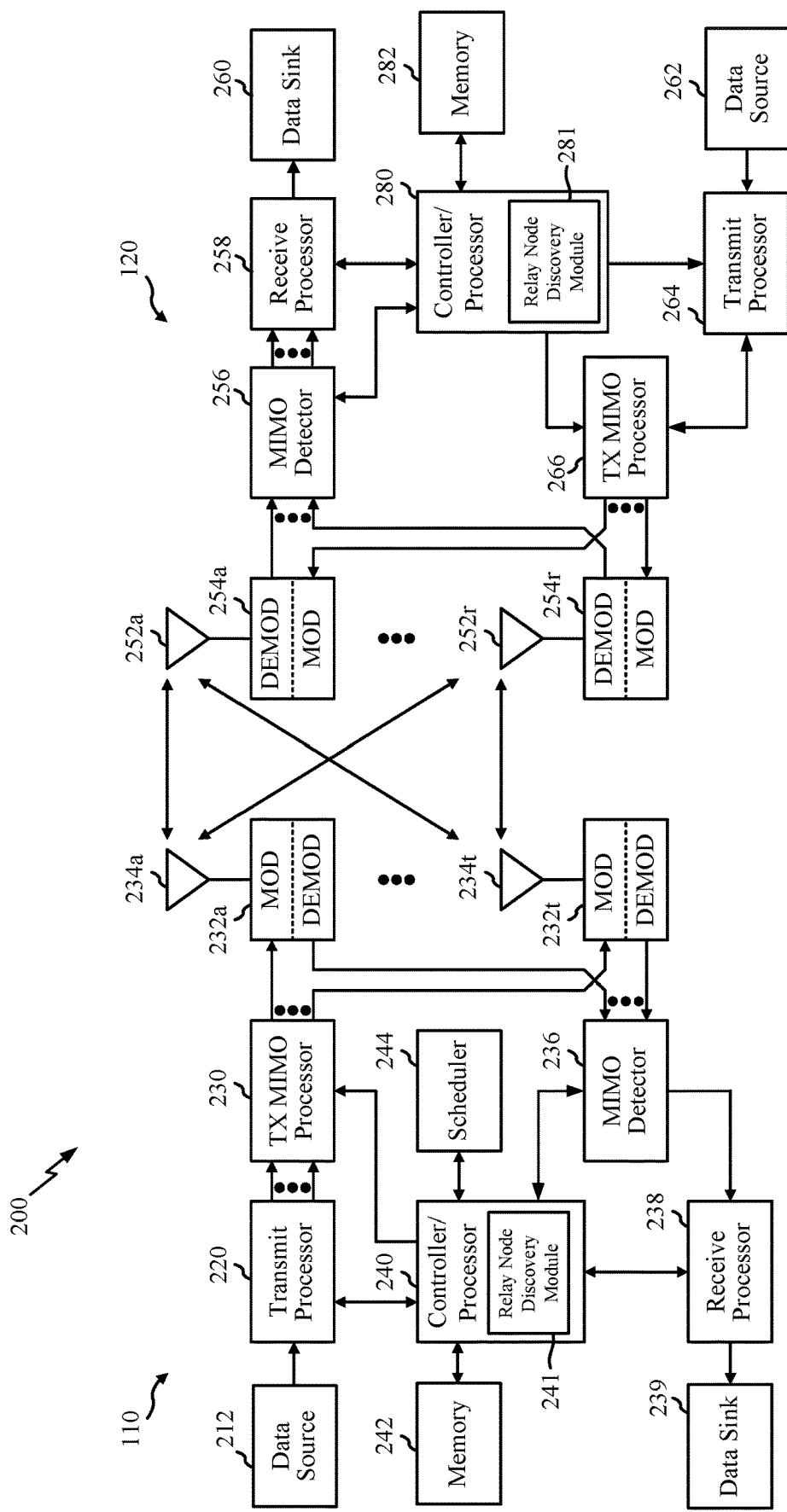
FIG. 2 is a block diagram conceptually illustrating a design of an example BS and UE, in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a includes a relay node discovery module 241 that may be configured to perform the operations illustrated in one or more of FIG. 5, as well as other operations disclosed herein for millimeter wave relay node discovery based on group wake up signaling, according to aspects described herein. As shown in FIG. 2, the controller/processor 280 of the UE 120a includes relay node discovery module 281 that may be configured to perform the operations illustrated in one or more of FIG. 6, as well as other operations disclosed herein for millimeter wave relay node discovery based on group wake up signaling, according to aspects described herein. Although shown at the Controller/Processor, other components of the UE 120a and BS 110a may be used performing the operations described herein.

Example Millimeter Wave Systems

As used herein, the term millimeter wave (mmWave) may generally refer to spectrum bands in very high frequencies such as 24 GHz and beyond. Such frequencies may provide very large bandwidths capable of delivering multi-Gbps data rates, as well as the opportunity for extremely dense spatial reuse to increase capacity. Traditionally, these higher frequencies were not robust enough for low-cost/complexity circuit implementations to allow indoor/outdoor mobile broadband applications and to overcome high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave can be leveraged to form narrow directional beams that can send and receive more energy, which may help overcome the propagation/path loss challenges.

These narrow directional beams can also be utilized for spatial reuse. This is one of the key enablers for utilizing mmWave for mobile broadband services. In addition, the non-line-of-sight (NLOS) paths (e.g., reflections from nearby buildings, lamp posts, vehicles, objects, etc.) can have very large energies, providing alternate paths when the line-of-sight (LOS) path is blocked. Aspects of the present disclosure may take advantage of such directional beams, for example, by using the beams for relaying communication.

Figure 3:
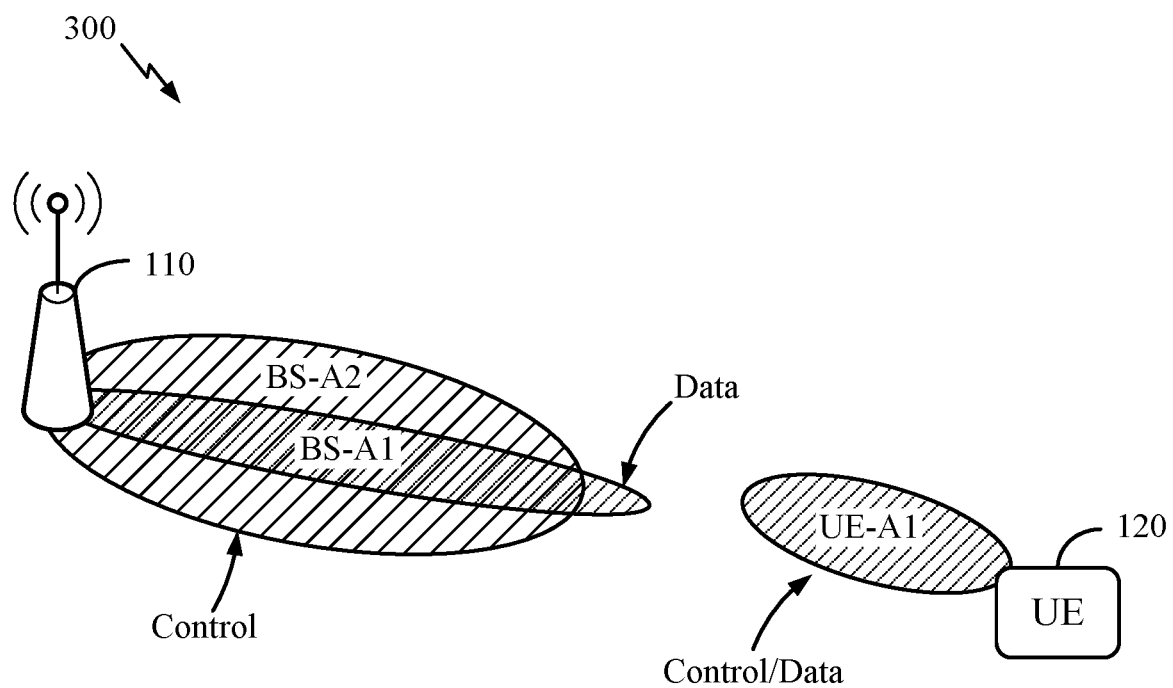
FIG. 3 illustrates an exemplary millimeter wave system including active beams, in accordance with certain aspects of the present disclosure.

FIG. 3 illustrates an example of active beams 300, in accordance with aspects of the present disclosure. A base station (e.g., BS 110) and a UE (e.g., UE 120) may communicate using a set of active beams. Active beams may refer to BS and UE beam pairs that are used to transmit data and control channels. A data beam may be used to transmit data and a control beam may be used to transmit control information. As illustrated in FIG. 3, data beam BS-A1 may be used to transmit DL data and control beam BS-A2 may be used to transmit DL control information.

A BS may monitor beams using beam measurements and feedback from a UE. For example, a BS may monitor active beams using DL reference signals. The BS may transmit a DL RS, such as a measurement reference signal (MRS), channel state information reference signal (CSI-RS), or a synchronization (synch) signal. The UE may report, to the BS, a reference signal receive power (RSRP) associated with a received reference signal. In this manner, the BS may monitor active beams.

Example Group Wake Up Signaling for Millimeter Wave Relay Node Discovery

Millimeter wave (mmWave) systems are well-established fifth generation (5G) new radio (NR) standards. Currently, mmWave relaying has become has become a focus of Release 17 standardization work. Prior to Release 17, relaying in mmWave frequencies has not been considered. Relaying is a natural enhancement to the standard specifications that enables different capabilities, such as multi-hop transmissions of desired signals, assisted communications, etc. However, to enable these objectives, mmWave relaying presents a number of problems due to the associated directional transmissions, power, thermal, and maximum permissible exposure (MPE) constraints. Further, due to power consumption issues, most millimeter wave UEs (if not in active data mode) may be operating in a sleep mode with connected mode discontinuous reception (CDRX), which presents issues for mmWave relay node discovery.

Figure 4:
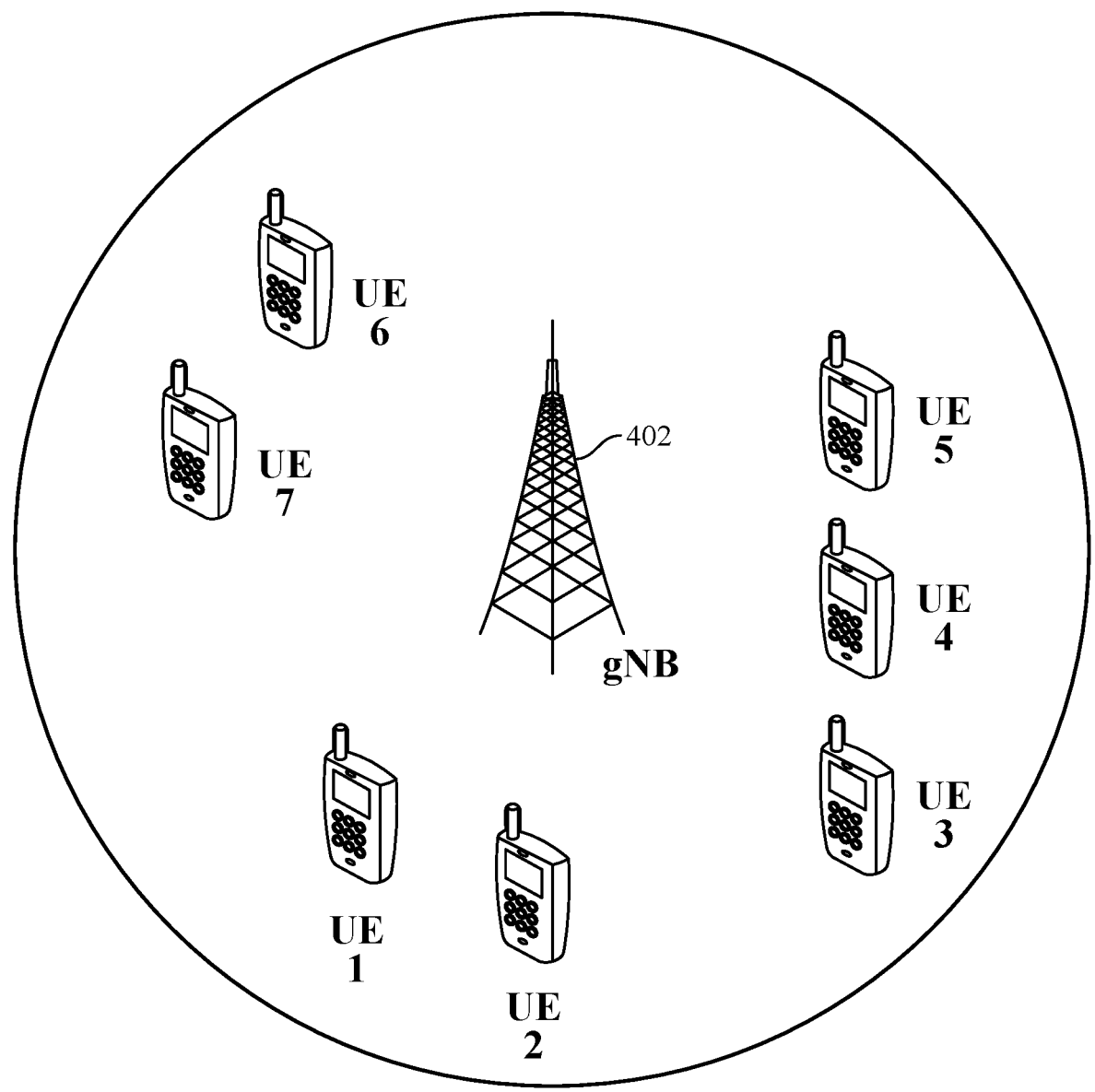
FIG. 4 illustrates an exemplary cell in a millimeter wave system, in accordance with certain aspects of the present disclosure.

For example, with reference to FIG. 4, a cell may include a plurality of UEs (UEs 1-7), which may all be connected to the gNB/BS 402. In some cases, UEs 1-7 may comprise one or more of the UEs 120 and the gNB/BS 402 may comprise the BS 110. To facilitate efficient communication within the cell, certain UEs may act as relay nodes for other UEs to relay information to the gNB. While the gNB 402 may know the identifiers of each UE (e.g., cell radio network temporary identifier (C-RNTI), serving temporary mobile subscriber identity (S-TMSI), or temporary identity used in next update (TIN)) as well as the approximate locations of each UE, a UE may not know the existence of the other UEs until either (1) the UE discovers the other UEs autonomously, or (2) the UE is informed of the existence of the other UEs by the gNB/BS 402.

In the scenario of autonomous discovery, the UE may perform beam scanning and learn the existence of neighboring devices (e.g., neighboring UEs) as other UEs listen. However, if the neighboring devices are operating according to a different sleep schedule, the UE may not be able to discover the neighboring devices to allow for relaying in the mmWave system. For example, with reference to FIG. 4, in some cases, UE 1 may be operating according to a first sleep schedule that instructs UE 1 to wake up at a first time while UE 2 may be operating according to a second sleep schedule that instructs UE 2 to wake up at a second time different than the first time. Thus, as can be seen, since UE 1 and UE 2 wake up at different times, these UEs may not be able to discover each other and coordinate via mmWave relaying.

Thus, in order to ensure that UEs are coordinated in some form of wake up cycle so that they can actively discover each other, in certain cases, a base station may transmit a wake up signal (WUS) to all UEs within a cell to simultaneously wake up each of the UEs at the same time. However, if, for example, UE 1 in FIG. 4 wants to perform discovery, it may not be efficient (e.g., from a power consumption standpoint) to wake up every UE within the cell as UE 1 may not be able to detect all the UEs within the cell due to proximity. For example, even if all UEs are woken up within the cell in FIG. 4 so that UE 1 can perform discovery to discover neighboring devices, the UE 1 may not be able to detect, for example, UE 5 due to the proximity of UE 5. Thus, providing a WUS in this manner to wake up all UEs within a cell may lead to power inefficiencies. That is, from the perspective of UE 5, it may not be efficient from a power consumption standpoint to wake up UE 5 when UE 1 wants to perform discovery as UE 1 may not be able to detect UE 5 anyway.

Thus, aspects of the present disclosure provide techniques to help address the issues described above with conflicting wake up cycles during mmWave discovery while also improving power consumption efficiency. For example, in some cases, techniques to address these issues may involve configuring a plurality of WUSs for transmission to different groups of UEs in a cell based on a relative location of each of the UEs in the different groups of UEs.

Figure 5:
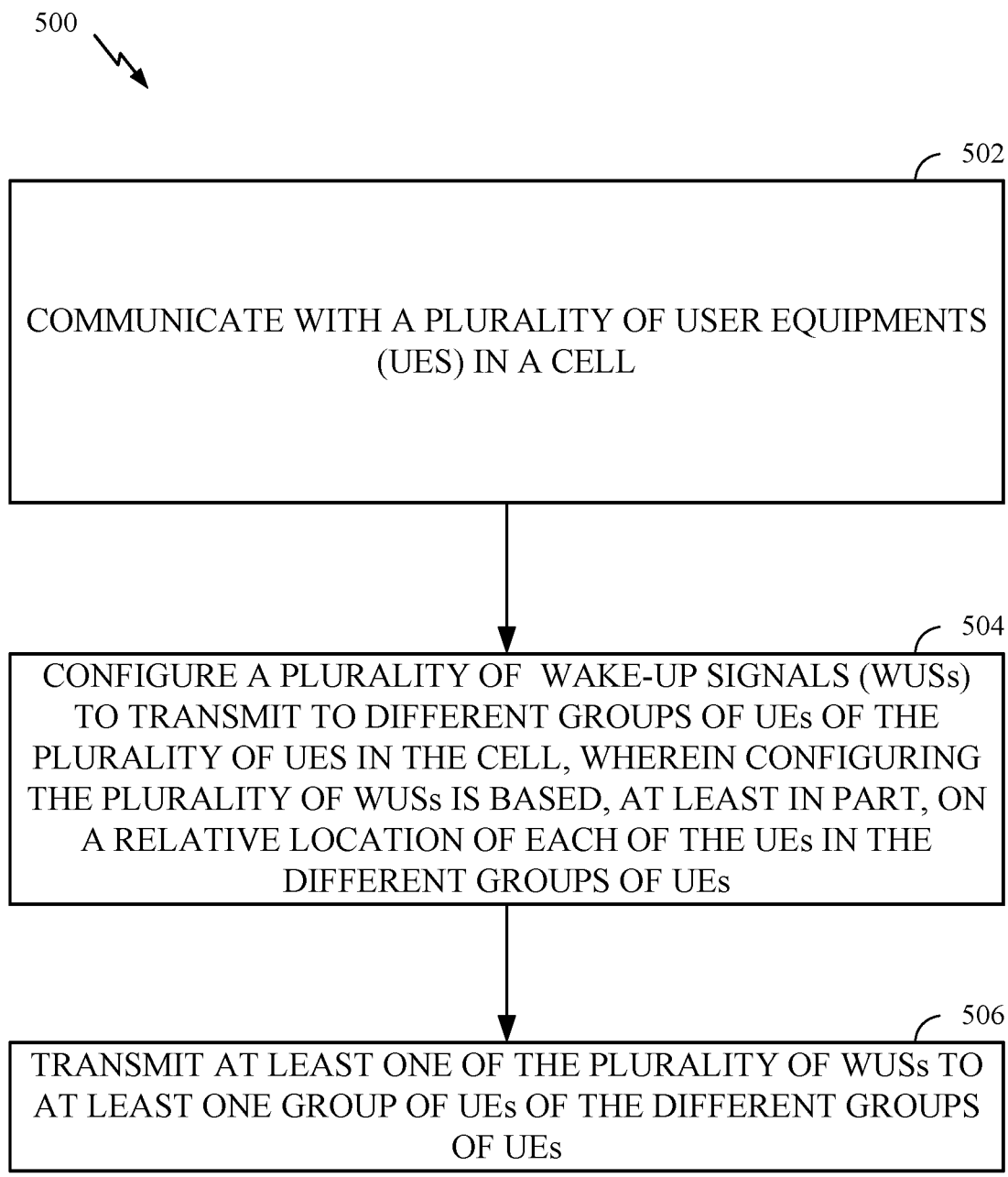
FIG. 5 is a flow diagram illustrating example operations for wireless communication by a base station (BS), in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100). Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at 502, by communicating with a plurality of user equipments (UEs) in a cell.

At 504, the BS configures a plurality of wake-up signals (WUSs) to transmit to different groups of UEs of the plurality of UEs in the cell, wherein configuring the plurality of WUSs is based, at least in part, on a relative location of each of the UEs in the different groups of UEs.

At 506, the BS transmits at least one of the plurality of WUSs to at least one group of UEs of the different groups of UEs.

Figure 6:
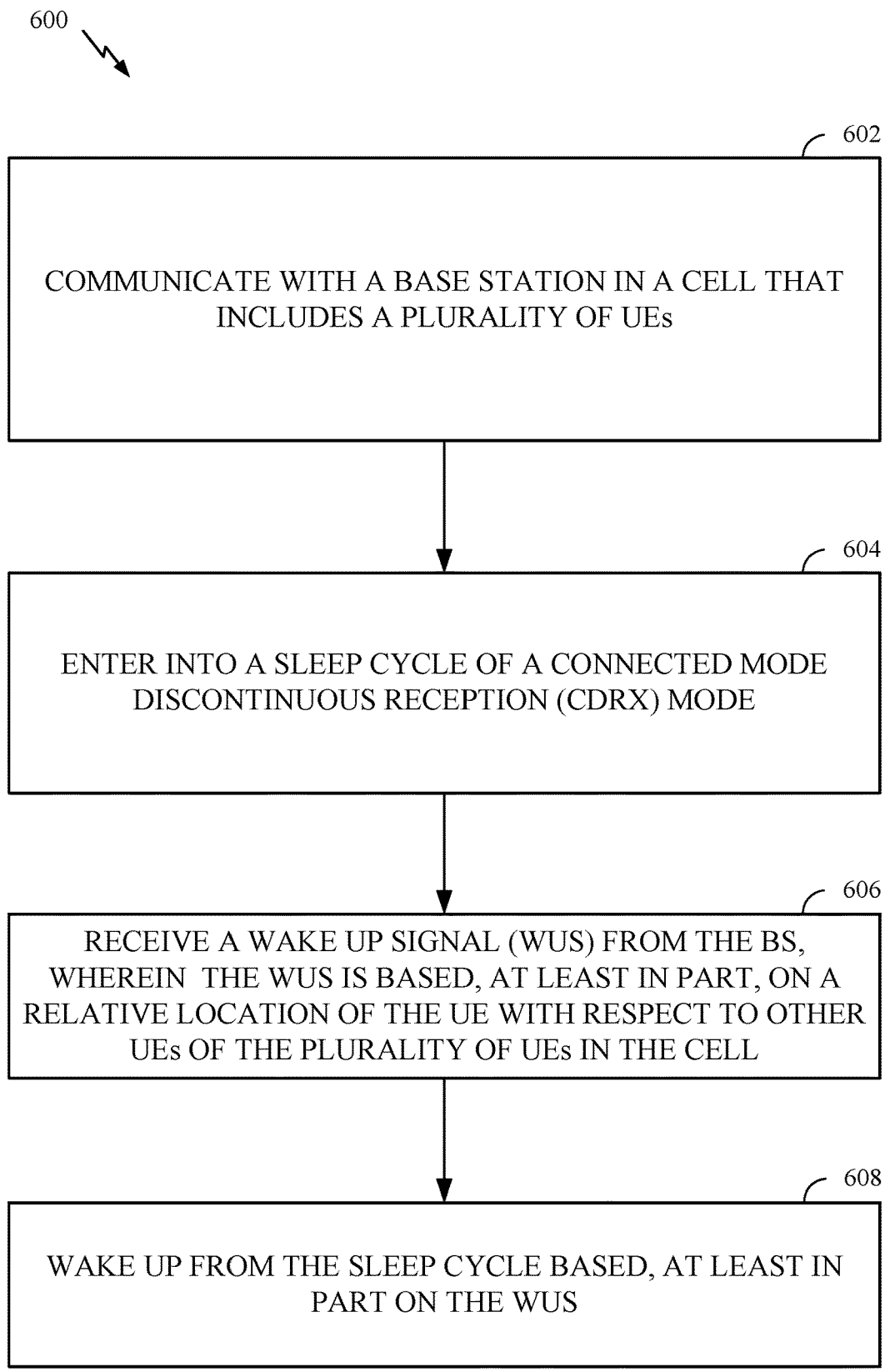
FIG. 6 is a flow diagram illustrating example operations for wireless communication by a user equipment (UE), in accordance with certain aspects of the present disclosure.

FIG. 6 is a flow diagram illustrating example operations 600 for wireless communication, in accordance with certain aspects of the present disclosure. The operations 600 may be performed, for example, by UE (e.g., such as a UE 120a in the wireless communication network 100). The operations 600 may be considered complimentary to operations 500 performed by the BS. Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 602, by communicating with a base station in a cell that includes a plurality of UEs.

At 604, the UE enters into a sleep cycle of a connected mode discontinuous reception (CDRX) mode.

At 606, the UE receives a wake up signal (WUS) from the BS, wherein the WUS is based, at least in part, on a relative location of the UE with respect to other UEs of the plurality of UEs in the cell.

At 608, the UE wakes up from the sleep cycle based, at least in part on the WUS.

As noted above, aspects of the present disclosure provide techniques to assist with discovery between UEs in mmWave systems, for example, when the UEs operate in a discontinuous reception (DRX) mode. For example, given the higher power consumption with higher carrier frequencies (e.g., frequency rage 2 (FR2): 24.250 MHz to 52.600 MHz), UEs may be optimized to be in connected mode discontinuous reception (CDRX) quite often (e.g., either micro or deep sleep) to save power. In mmWave relay node use-cases, to avoid non-discovery of certain UEs, a gNB may configure a fully or partially coordinated group wake-up signal (WUS) that wakes up UEs that are geographically close in proximity at a common time-period. For example, in some cases, aspects of the present disclosure may involve configuring a plurality of WUSs and transmitting the WUSs to different groups of UEs within a cell, which may be grouped based on a relative geographical location of each UE within a particular group of UEs. A WUS transmitted to a particular group of UEs may wake up those UEs within that group, allowing these UEs to discover each other in an effort to facilitate mmWave relaying.

For example, as noted above, a first UE may communicate with a base station (e.g., gNB) in a cell that includes a plurality of UEs. Likewise, the BS may communicate with the plurality of UEs in the cell, including the first UE. At some point in time, the first UE may enter a sleep cycle associated with a connected mode discontinuous reception mode (e.g., CDRX) to conserve power. Other UEs within the cell (e.g. in some cases, in close proximity to the first UE) may also be operating in a connected mode discontinuous reception mode, waking and sleeping according to a different schedule as compared to the first UE. Thus, in such a scenario, while the UE may be in close proximity to these other UEs, the first UE may not be able to discover these other UEs.

Therefore, to help coordinate discovery between UEs, the BS may configure a plurality of wake-up signals (WUSs) to transmit to different groups of UEs of the plurality of UEs in the cell. In some cases, the plurality of WUSs may be configured based, at least in part, on a relative location of each of the UEs in the different groups of UEs. For example, for discovery of UEs, the BS may configure a fully- or partially-coordinated group WUS that wakes up UEs that are in geographically close proximity of each other at a common time-period.

Figure 7:
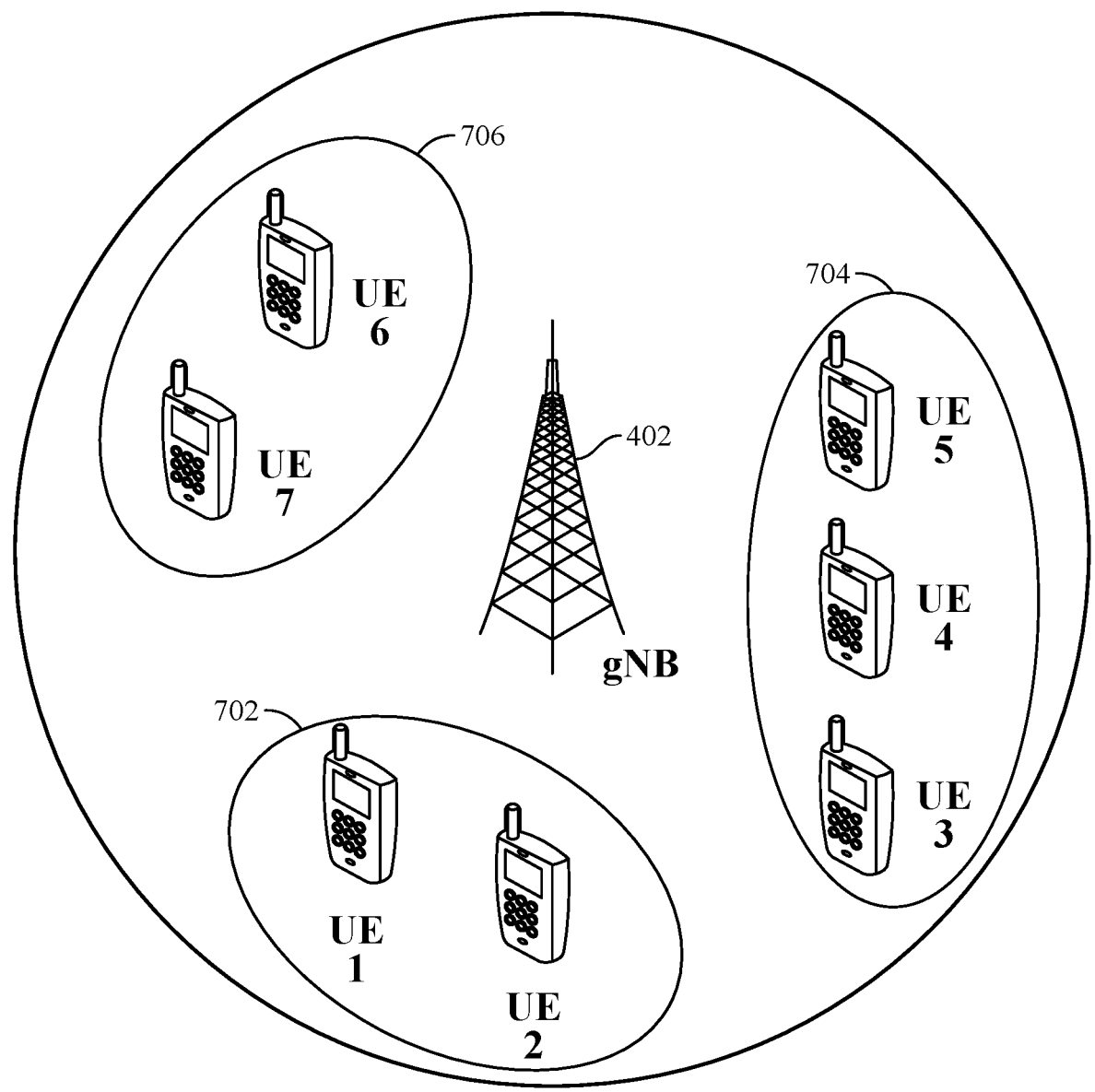
FIG. 7 illustrates grouping of user equipments in a cell, in accordance with certain aspects of the present disclosure.

For example, as illustrated in FIG. 7, the BS 402 may group the plurality of UEs in the cell (e.g., UEs 1-7) into different groups based on relative locations of the UEs (e.g., relative to each other). For example, as illustrated, UE 1 and UE 2 may be grouped by the BS 402 into a first group 702 since UE 1 and UE2 are in close proximity to each other. Likewise UE 3, UE 4, and UE 5 may be grouped by the BS 402 in second group 704 and UE 6 and UE7 may be grouped by the BS 402 in a third group 706. In some cases, the UEs may be grouped based on their relative location to facilitate mmWave relay node discovery. For example, UE 1 and UE 2 may be grouped into the first group 702 as UE 1 and UE 2 are likely within range of each other to perform relaying, whereas UE 1 and UE 5 may be grouped in different groups (e.g., group 702 vs. group 704) as UE 5 may be too far for UE 1 to detect UE 5.

Additionally, in some cases, the BS may determine an approximate location of each of the UEs in the cell based on positioning signals and group the UEs into the different groups of UEs based on the approximate locations of the UEs. For example, in some cases, a first UE (e.g., UE 1) may transmit positioning signals to the BS 402, which may then estimate the location of the first UE. The BS 402 may then group the first UE into a group of UEs that are geographically closely located. For example, as illustrated in FIG. 7, the BS 402 may group the first UE (e.g., UE 1) into a first group of UEs that includes UE 2 as both UE 1 and UE 2 are located geographically close to each other. In some cases, these positioning signals may comprise legacy-based positioning signals, such as fourth generation (4G) and earlier positioning signals. Additionally, in some cases, the positioning signals may comprise newer positioning signals, such as 5G-NR or later positioning signals.

As noted, a plurality of WUSs may be configured by the BS based on these different groups of UEs. In some cases, the plurality of WUSs may be partially coordinated or fully coordinated with respect to the different groups of UEs.

For example, for a fully coordinated group WUS configuration, the BS 402 may transmit one or more WUSs to different groups of UEs, allowing each of the UEs in these different groups to wake up at a particular wake-up opportunity. For example, the BS may transmit a first WUS of the plurality of WUSs to each UE of the first group 702 of UEs.

As noted above, the first WUS may be based, at least in part, on a relative location of the UEs in the first group 702 with respect to other UEs of the plurality of UEs in the cell. According to aspects, the first WUS may instruct only the UEs in the first group 702 of UEs to wake up at a first wake-up opportunity. For example, with reference to FIG. 7, the BS may transmit a first WUS to the first group 702, including UE 1 and UE 2. The first WUS may instruct only UE 1 and UE 2 to wake up at a first wake-up opportunity. For example, from the perspective of a first UE (e.g., UE 1), the first UE may receive the first WUS and wake up from the sleep cycle described above based, at least in part on the first WUS. Thereafter, the first UE and/or the second UE (e.g., UE 2) may perform a discovery procedure to discover other UEs within the same first group 702 of UEs. For example, in some cases, once the first UE is woken up in response to the first WUS, the first UE can transmit a discovery signal and other neighboring UEs (e.g., in the same first group), such as UE 2, that have also been woken up can listen to the discovery signal, detect and discover the first UE. Thereafter, in some cases, based on the discovery procedure, the first UE may establish a relay link with the other UEs.

Additionally, in some cases, the BS may transmit a second WUS of the plurality of WUSs to each UE of a second group 704 of UEs of the different groups of UEs. As with the first WUS, the second WUS may instruct only the UEs in the second group 704 of UEs to wake up at a second wake-up opportunity, allowing the UEs in the second group of UEs to perform discovery as described above. In some cases, the BS may transmit the first WUS and the second WUS simultaneously. In other cases, the BS may transmit the first WUS and the second WUS sequentially. For example, in some cases, the BS may transmit the first WUS first and the second WUS second or vice versa. Additionally, it should be noted that, in some cases, a UE may be included in multiple groups (e.g., the first group 702 and the second group 704), allowing that UE to perform discovery in each of the multiple groups.

Figure 8:
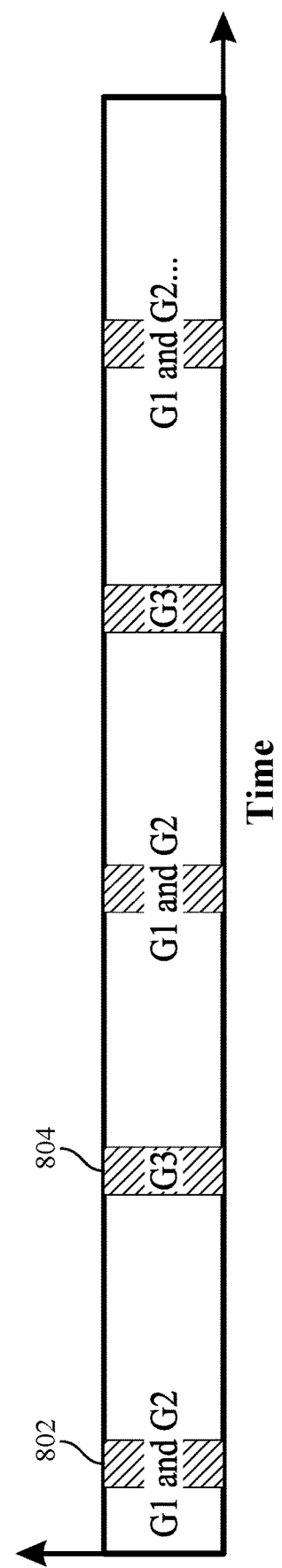
FIG. 8 illustrates an exemplary wake up opportunity configuration for different groups of user equipments, in accordance with certain aspects of the present disclosure.

In some case, the BS may configure the first group 702 of UEs and the second group 704 of UEs to wake up in a same or different wake-up opportunity. For example, as illustrated in FIG. 8, the BS may configure the first group of UEs (e.g., $G_1$) and the second group of UEs ($G_2$) in a first wake-up opportunity 802 while also configuring a third group of UEs ($G_3$) in a second wake-up opportunity 804. Accordingly, the BS may transmit one or more WUSs to UEs in the first group of UEs and the second group of UEs, instructing these UEs to wake up in the first wake-up opportunity 802. Further, the BS may also transmit one or more WUSs to the UEs in the third group of UEs, instructing these UEs to wake up in the second wake-up opportunity 804. In some cases, as shown in FIG. 8, the one or more WUS transmissions to the first, second, and third groups of UEs may be periodic and semi-statically configured by the BS, for example, based on a BS determination or request from a subset of UEs in the cell. Additionally, in some cases, the one or more WUSs transmitted to different groups of UEs may be one of a same type of WUS configuration or different types of WUS configurations.

According to aspects, for a partially coordinated group WUS configuration, the BS 402 may transmit WUSs to different UEs in different groups according to a transmission pattern that allows for wake-up opportunities for different combinations of UEs in the same or differing groups of UEs to coincide at least once over a certain period. According to aspects, by configuring/transmitting WUSs in this manner, the BS may ensure that every UE within the cell may share at least one wake-up opportunity with every other UE in the cell.

For example, in some cases, with reference to FIG. 7, the BS may transmit a first WUS of the plurality of WUSs to a first combination of UEs from the first group 702 of UEs of the different groups of UEs and the second group 704 of UEs of the different groups of UEs, instructing the first combination of UEs to wake up at a first wake-up opportunity. Further, in some cases, the BS 402 may also transmit a second WUS of the plurality of WUSs to a second combination of UEs from the first group 702 of UEs and the second group 704, instructing the second combination of UEs to wake up at a second wake-up opportunity. In some cases, the first combination of UEs is different from the second combination of UEs. While the above example only includes a first WUS and a second WUS, it should be understood that the BS may transmit any number of WUSs to any number of combinations of UEs from any number of groups of UEs.

Figure 9:
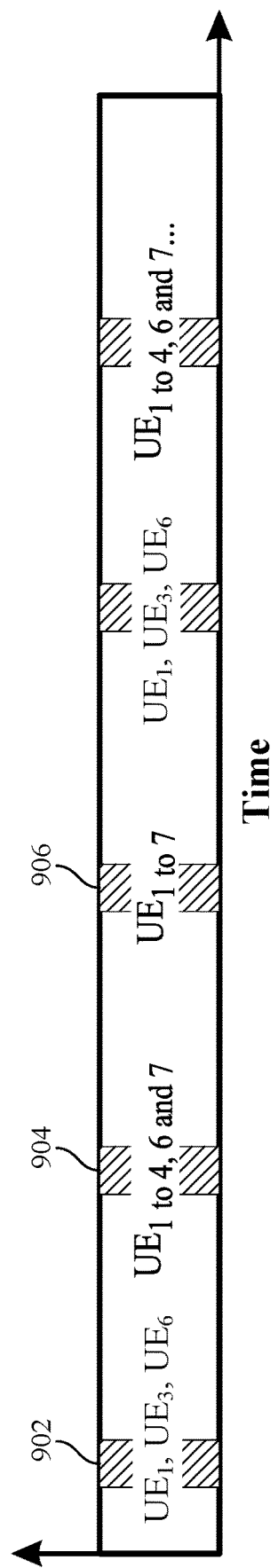
FIG. 9 illustrates an exemplary transmission pattern for transmitting wake-up signals in different wake-up opportunities for different groups of user equipments, in accordance with certain aspects of the present disclosure.

For example, as illustrated in FIG. 9, for a first transmission pattern, the BS 402 may transmit a first WUS to a first combination of UEs, instructing these UEs to wake up at a first wake-up opportunity 902. As illustrated, the first combination of UEs may comprise a first subset of UEs from a first group of UEs, a second subset of UEs from the second group of UEs, and a third subset of UEs from a third group of UEs. More specifically, as illustrated, the first combination of UEs may comprise UE 1 from the first group 702 of UEs (e.g., as illustrated in FIG. 7), UE 3 from the second group 704 of UEs (e.g., as illustrated in FIG. 7), and UE 6 from the third group 706 of UEs (e.g., as illustrated in FIG. 7). Thus, according to aspects, based on the transmission pattern, the first WUS may instruct UE 1 to wake up in the first wake-up opportunity 802, which is shared with at least one UE from a second group of UEs of the plurality of different groups of UEs, such as UE 3 and UE 6.

According to aspects, while awake, UE 1 may perform a discovery procedure by transmitting or receiving discovery signals, as described above, allowing one or more of UE 3 or UE 6 to discover UE 1 or vice versa. Thereafter, based on the discovery procedure, UE 1 may establish a relay link with one or more of UE 3 or UE 6.

Further, for a second transmission pattern, the BS 402 may also transmit a second WUS to a second combination of UEs, instructing these UEs to wake up at a second wake-up opportunity 904. According to aspects, the second combination of UEs may comprises a fourth subset of UEs from the first group 702 of UEs, a fifth subset of UEs from the second group 704 of UEs, and a sixth subset of UEs from the third group 706 of UEs. For example, with reference to FIG. 7, the second combination of UEs may include UEs 1 and 2 of the first group 702, UEs 3-4 of the second group 704, and UEs 6-7 of the third group 706. During the second wake-up opportunity 904, the second combination of UEs may wake up and perform a discovery procedure (e.g., transmitting/receiving discovery signals) to establish a relay link, as described above.

Additionally, for a third transmission pattern, the BS 402 may also transmit a third WUS to a third combination of UEs, instructing these UEs to wake up at a third wake-up opportunity 906. According to aspects, the third combination of UEs comprises a seventh subset of UEs from the first group 702 of UEs, an eighth subset of UEs from the second group 704 of UEs, and a ninth subset of UEs from the third group 706 of UEs. For example, with reference to FIG. 7, the second combination of UEs may include UEs 1 and 2 of the first group 702, UEs 3-5 of the second group 704, and UEs 6-7 of the third group 706. During the third wake-up opportunity, the third combination of UEs may wake up and perform a discovery procedure (e.g., transmitting/receiving discovery signals) to establish a relay link, as described above.

According to aspects, as illustrated in FIG. 9, the different WUS transmission/wake-up opportunities 902-906 may be scheduled periodically and semi-statically configured. For example, as illustrated in FIG. 9, the first wake-up opportunity 902, the second wake-up opportunity 904, and the third wake-up opportunity 906 may repeat periodically over time, which may be semi-statically configured to occur for an extended period of time.

While FIG. 9 illustrates different combinations of UEs that include specific subsets of UEs, it should be understood that each combination of UEs may include any combination of subsets of UEs from different groups.

As illustrated, by transmitting WUSs according to the transmission patterns described above, the BS 402 can ensure that each UE in the different groups of UEs shares a same wake-up opportunity with every other UE in the different groups of UE, allowing for comprehensive discovery between UEs while also being power conscientious.

According to aspects, in some cases, transmission of the one or more WUSs described above by the base station may be based on a relay node discovery request from one or more UEs in the cell. For example, in some cases, the BS 402 may receive a relay node discovery request from one or more UEs in the cell (e.g., UEs 1-7), such as a first UE (e.g., UE 1). According to aspects, the relay node discovery request may indicate that the first UE wants to perform a discovery procedure to discover other UEs in the cell, such as UEs in at least one of the first group 702 of UEs, the second group 704 of UEs, or the third group 706 of UEs. According to aspects, in response to receiving the relay node discovery request, the BS may transmit the one or more WUSs to facilitate discovery between the first UE and other UEs in one or more of the first group 702 of UEs, second group 704 of UEs, or the third 706 group of UEs.

Figure 10:
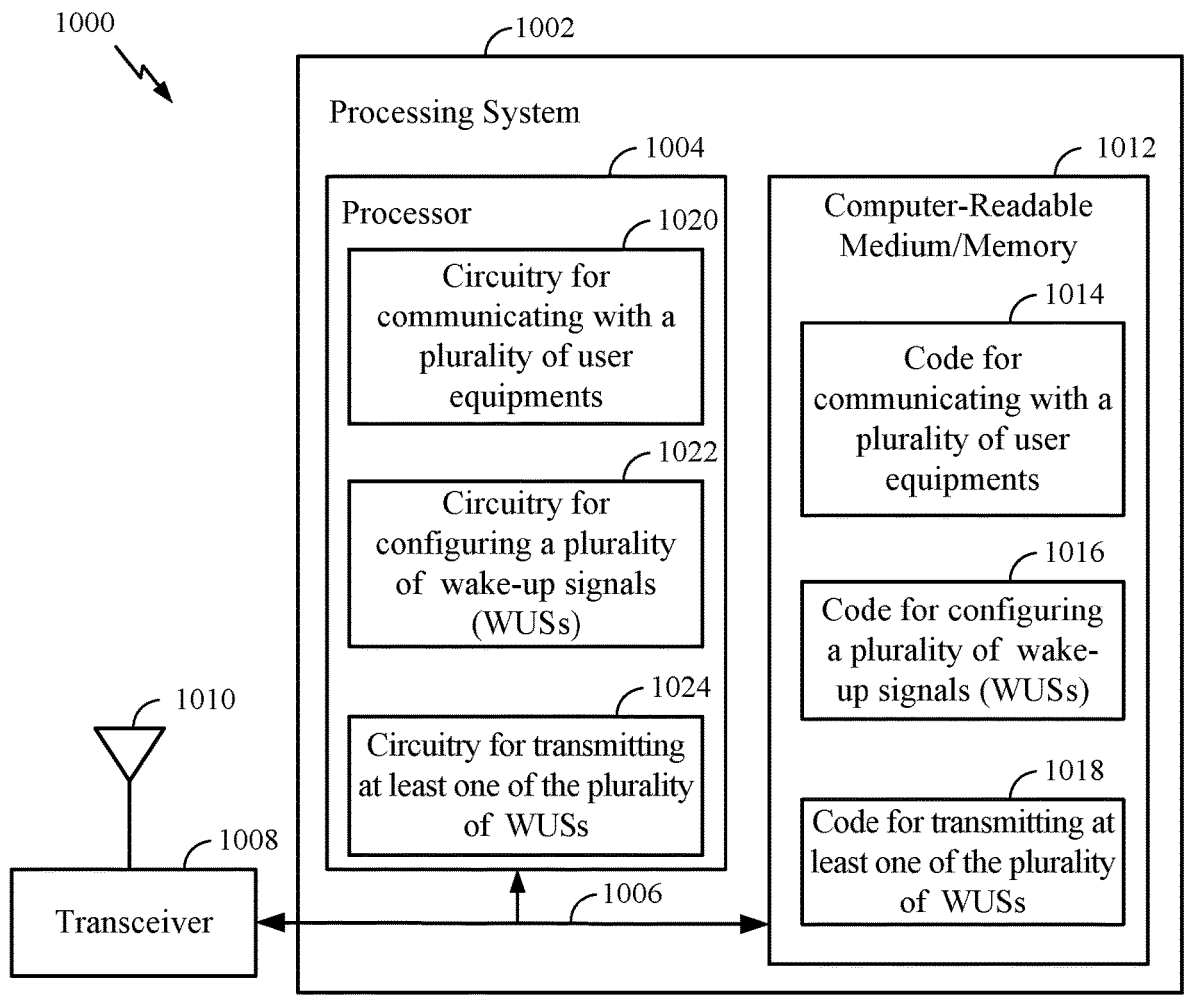
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 5 as well as other operations for performing the various techniques discussed herein for millimeter wave relay node discovery based on group wake up signaling. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 5, as well as other operations for performing the various techniques discussed herein for millimeter wave relay node discovery based on group wake up signaling. In certain aspects, computer-readable medium/memory 1012 stores code 1014 for communicating with a plurality of user equipments (UEs) in a cell; code 1016 for configuring a plurality of wake-up signals (WUSs) to transmit to different groups of UEs of the plurality of UEs in the cell, wherein configuring the plurality of WUSs is based, at least in part, on a relative location of each of the UEs in the different groups of UEs; and code 1018 for transmitting at least one of the plurality of WUSs to at least one group of UEs of the different groups of UEs.

In certain aspects, the processor 1004 includes circuitry configured to implement the code stored in the computer-readable medium/memory 1012. For example, the processor 1004 includes circuitry 1020 for communicating with a plurality of user equipments (UEs) in a cell; circuitry 1022 for configuring a plurality of wake-up signals (WUSs) to transmit to different groups of UEs of the plurality of UEs in the cell, wherein configuring the plurality of WUSs is based, at least in part, on a relative location of each of the UEs in the different groups of UEs; and circuitry 1024 for transmitting the plurality of WUSs to the different groups of UEs.

Figure 11:
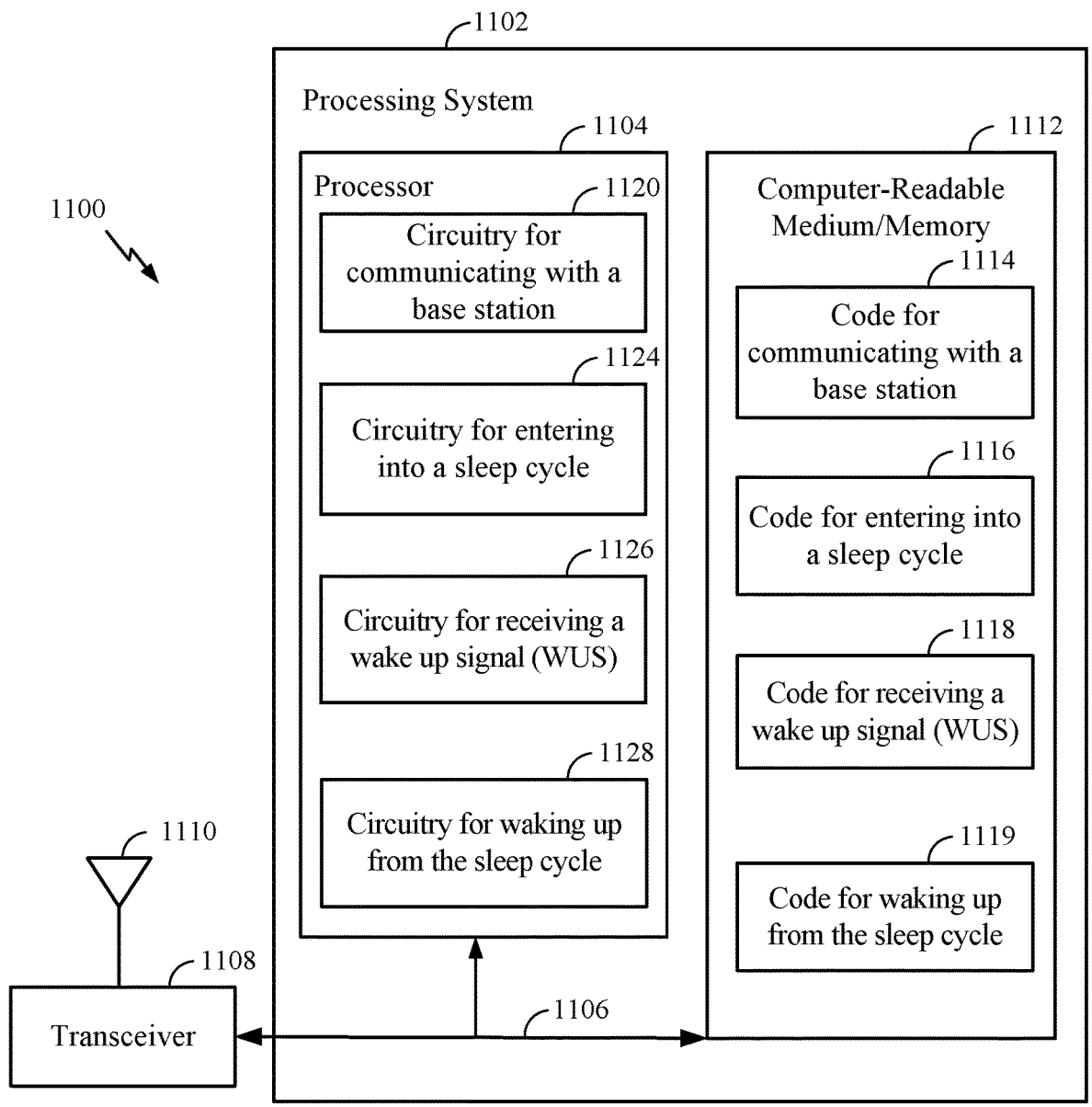
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 6 as well as other operations for performing the various techniques discussed herein for millimeter wave relay node discovery based on group wake up signaling. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1004 to perform the operations illustrated in FIG. 6, as well as other operations for performing the various techniques discussed herein for millimeter wave relay node discovery based on group wake up signaling. In certain aspects, computer-readable medium/memory 1112 stores code 1114 for communicating with a base station in a cell that includes a plurality of UEs; code 1116 for entering into a sleep cycle of a connected mode discontinuous reception (CDRX) mode; code 1118 for receiving a wake up signal (WUS) from the BS, wherein the WUS is based, at least in part, on a relative location of the UE with respect to other UEs of the plurality of UEs in the cell; and code 1119 for waking up from the sleep cycle based, at least in part on the WUS.

In certain aspects, the processor 1104 includes circuitry configured to implement the code stored in the computer-readable medium/memory 1112. For example, the processor 1104 includes circuitry 1120 for communicating with a base station in a cell that includes a plurality of UEs; circuitry 1122 for entering into a sleep cycle of a connected mode discontinuous reception (CDRX) mode; circuitry 1124 for receiving a wake up signal (WUS) from the BS, wherein the WUS is based, at least in part, on a relative location of the UE with respect to other UEs of the plurality of UEs in the cell; and circuitry 1126 for waking up from the sleep cycle based, at least in part on the WUS.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a base station (BS), comprising:
at least one processor configured to:
communicate with a plurality of user equipments (UEs) in a cell;
configure a plurality of wake-up signals (WUSs) to transmit to different groups of UEs of the plurality of UEs in the cell, wherein configuring the plurality of WUSs is based, at least in part, on a relative location of each of the UEs in the different groups of UEs; and
transmit at least one of the plurality of WUSs to at least one group of UEs of the different groups of UEs, wherein:
the at least one processor is configured to transmit the at least one of the plurality of WUSs by transmitting a first WUS of the plurality of WUSs to each UE of a first group of UEs of the different groups of UEs; and
the first WUS instructs only the UEs in the first group of UEs to wake up at a first wake-up opportunity; and
a memory coupled with the at least one processor.

2. The apparatus of claim 1, wherein the at least one processor is configured to transmit the at least one of the plurality of WUSs by:
transmitting a second WUS of the plurality of WUSs to each UE of a second group of UEs of the different groups of UEs, wherein the second WUS instructs only the UEs in the second group of UEs to wake up at a second wake-up opportunity.

3. The apparatus of claim 2, wherein the at least one processor is further configured to:
group UEs of the plurality of UEs into the first group of UEs based on a relative location of each of the UEs in the first group of UEs; and group UEs of the plurality of UEs into the second group of UEs based on a relative location of each of the UEs in the second group of UEs.

4. The apparatus of claim 3, wherein the at least one processor is configured to configure the plurality of WUSs based further on the grouping.

5. The apparatus of claim 2, wherein the first WUS and the second WUS are semi-statically scheduled to be transmitted either based on a BS determination or request from a subset of UEs in the cell.

6. The apparatus of claim 2, wherein the at least one processor is further configured to:
receive a relay node discovery request from a first UE in the first group of UEs; and
at least one of:
transmit the first WUS to each UE of a first group of UEs based on the relay node discovery request; or
transmit the second WUS to each UE of a second group of UEs based on the relay node discovery request.

7. The apparatus of claim 6, wherein the relay node discovery request indicates that the first UE wants to perform a relay node discovery procedure to discover other UEs in at least one of the first group of UEs or the second group of UEs.

8. The apparatus of claim 2, wherein the first WUS and the second WUS comprise one of:
a same type of WUS; or
different types of WUSs.

9. The apparatus of claim 1, wherein the at least one processor is further configured to transmit the at least one of the plurality of WUSs to the at least one group of UEs of the different groups of UEs according to a transmission pattern.

10. The apparatus of claim 9, wherein the at least one processor is configured to transmit the at least one of the plurality of WUSs by:
transmitting a first WUS of the plurality of WUSs to a first combination of UEs from a first group of UEs of the different groups of UEs and a second group of UEs of the different groups of UEs, instructing the first combination of UEs to wake up at a first wake-up opportunity; and
transmitting a second WUS of the plurality of WUSs to a second combination of UEs from the first group of UEs and the second group, instructing the second combination of UEs to wake up at a second wake-up opportunity.

11. The apparatus of claim 10, wherein the first combination of UEs is different from the second combination of UEs.

12. The apparatus of claim 10, wherein the at least one processor is further configured to:
group UEs of the plurality of UEs into the first group of UEs based on a relative location of each of the UEs in the first group of UEs; and
group UEs of the plurality of UEs into the second group of UEs based on a relative location of each of the UEs in the second group of UEs.

13. The apparatus of claim 10, wherein:
the first combination of UE comprises:
a first subset of UEs from the first group of UEs; and
a second subset of UEs from the second group of UEs; and
the second combination of UEs comprises:
a third subset of UEs from the first group of UEs; and
a fourth subset of UEs from the second group of UEs.

14. The apparatus of claim 1, wherein the at least one processor is further configured to:
receive positioning signals from UEs in the different groups of UEs; and
estimate the relative location of each of the UEs in the different groups of UEs based, at least in part, on the positioning signals.

15. The apparatus of claim 14, wherein the positioning signals comprise at least one of:
legacy-based positioning reference signals; or
5G New Radio-based positioning signals.

16. An apparatus for wireless communication by a user equipment (UE), comprising:
at least one processor configured to:
communicate with a base station (BS) in a cell that includes a plurality of UEs;
enter into a sleep cycle of a connected mode discontinuous reception (CDRX) mode;
receive a wake up signal (WUS) from the BS, wherein the WUS is based, at least in part, on a relative location of the UE with respect to other UEs of the plurality of UEs in the cell, wherein:
the UE is included in a first group of UEs of a plurality of different groups of UEs in the cell; and
the first group of UEs is based on a relative location of each of the UEs in the first group of UEs; and
the WUS instructs only UEs in the first group of UEs to wake up at a first wake-up opportunity; and
wake up from the sleep cycle based, at least in part on the WUS; and
a memory coupled with the at least one processor.

17. The apparatus of claim 16, wherein the at least one processor is further configured to receive the WUS according to a transmission pattern.

18. The apparatus of claim 17, wherein, based on the transmission pattern, the WUS instructs the UE to wake up at a first wake-up opportunity shared with at least one UE from a second group of UEs of the plurality of different groups of UEs.

19. The apparatus of claim 16, wherein the at least one processor is further configured to transmit a relay node discovery request to the BS.

20. The apparatus of claim 19, wherein the at least one processor is further configured to receive the WUS based on the relay node discovery request.

21. The apparatus of claim 19, wherein the relay node discovery request indicates that the UE wants to perform a relay node discovery procedure to discover other UEs in at least one of the first group of UEs or a second group of UEs of the plurality of different groups of UEs.

22. The apparatus of claim 16, wherein the WUS is semi-statically scheduled to be transmitted either based on a BS determination or request from a subset of UEs in the cell.

23. The apparatus of claim 16, wherein the at least one processor is further configured to transmit positioning signals to the BS, wherein:
the UE is included in the first group of UEs based, at least in part, on the positioning signals; and
the positioning signals comprise at least one of:
legacy-based positioning reference signals; or
5G New Radio-based positioning signals.

24. The apparatus of claim 16, wherein the at least one processor is further configured to perform a relay node discovery procedure to discover other UEs in the cell after waking up from the sleep cycle based on the WUS.

25. The apparatus of claim 24, wherein the at least one processor is configured to perform the relay node discovery procedure by one or more of:
 transmitting relay node discovery signals to the other UEs in the cell; or
 receiving relay node discovery signals from the other UEs in the cell.

26. The apparatus of claim 24, wherein the at least one processor is further configured to establish a relay link with at least one of the other UEs in the cell based on the relay node discovery procedure.

27. A method for wireless communication by a base station (BS), comprising:
 communicating with a plurality of user equipments (UEs) in a cell;
 configuring a plurality of wake-up signals (WUSs) to transmit to different groups of UEs of the plurality of UEs in the cell, wherein configuring the plurality of WUSs is based, at least in part, on a relative location of each of the UEs in the different groups of UEs; and
 transmitting at least one of the plurality of WUSs to at least one group of UEs of the different groups of UEs, wherein:
  transmitting the at least one of the plurality of WUSs comprises transmitting a first WUS of the plurality of WUSs to each UE of a first group of UEs of the different groups of UEs; and
  the first WUS instructs only the UEs in the first group of UEs to wake up at a first wake-up opportunity.

28. A method for wireless communication by a user equipment (UE), comprising:
 communicating with a base station (BS) in a cell that includes a plurality of UEs;
 entering into a sleep cycle of a connected mode discontinuous reception (CDRX) mode;
 receiving a wake up signal (WUS) from the BS, wherein the WUS is based, at least in part, on a relative location of the UE with respect to other UEs of the plurality of UEs in the cell, wherein:
  the UE is included in a first group of UEs of a plurality of different groups of UEs in the cell; and
  the first group of UEs is based on a relative location of each of the UEs in the first group of UEs; and
  the WUS instructs only UEs in the first group of UEs to wake up at a first wake-up opportunity; and
 waking up from the sleep cycle based, at least in part on the WUS.

* * * * *